Sept. 8, 1931.　　　R. L. FREDERICK ET AL　　　1,822,730
METHOD OF MACHINING INDIVIDUAL UNITS AND APPARATUS THEREFOR
Filed April 11, 1929　　　3 Sheets-Sheet 1
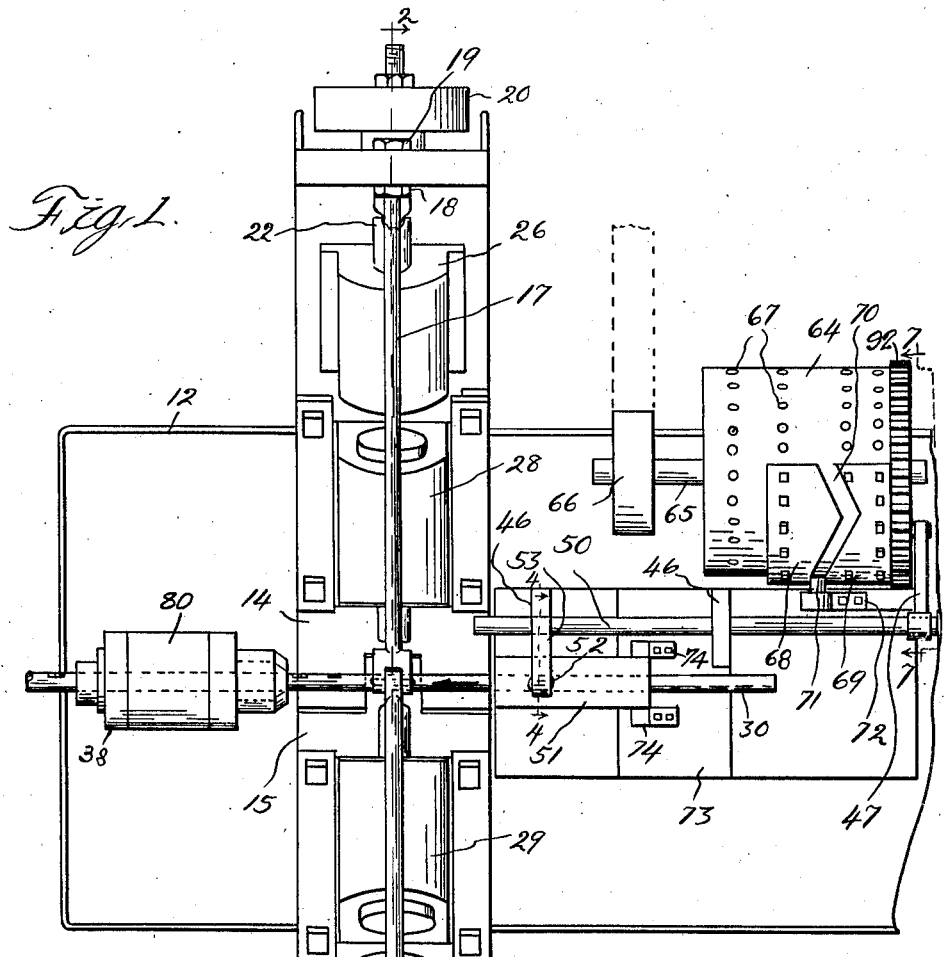
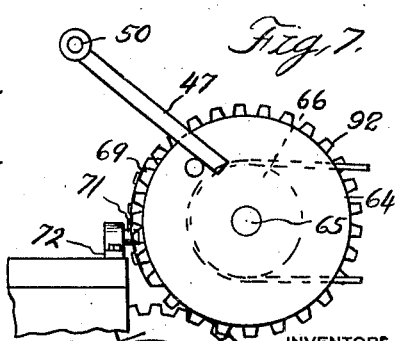
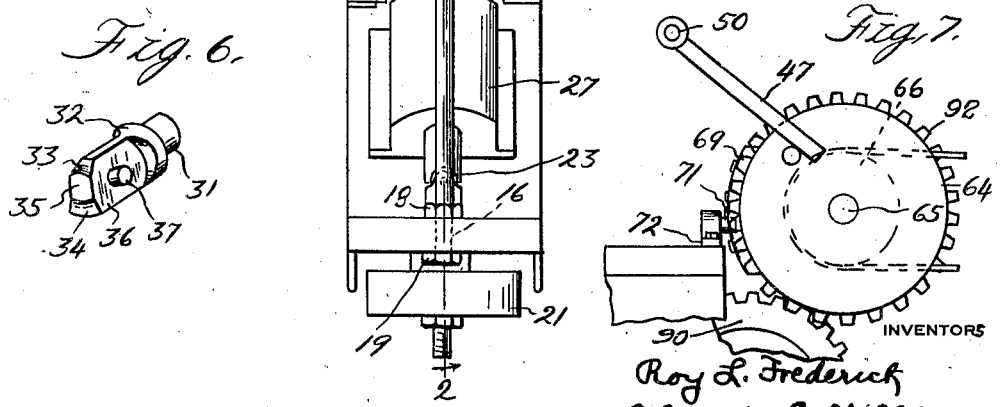
INVENTORS
Roy L. Frederick
Thomas L. Williams
BY Swan and Fry
ATTORNEYS Sept. 8, 1931.    R. L. FREDERICK ET AL    1,822,730
METHOD OF MACHINING INDIVIDUAL UNITS AND APPARATUS THEREFOR
Filed April 11, 1929    3 Sheets-Sheet 2
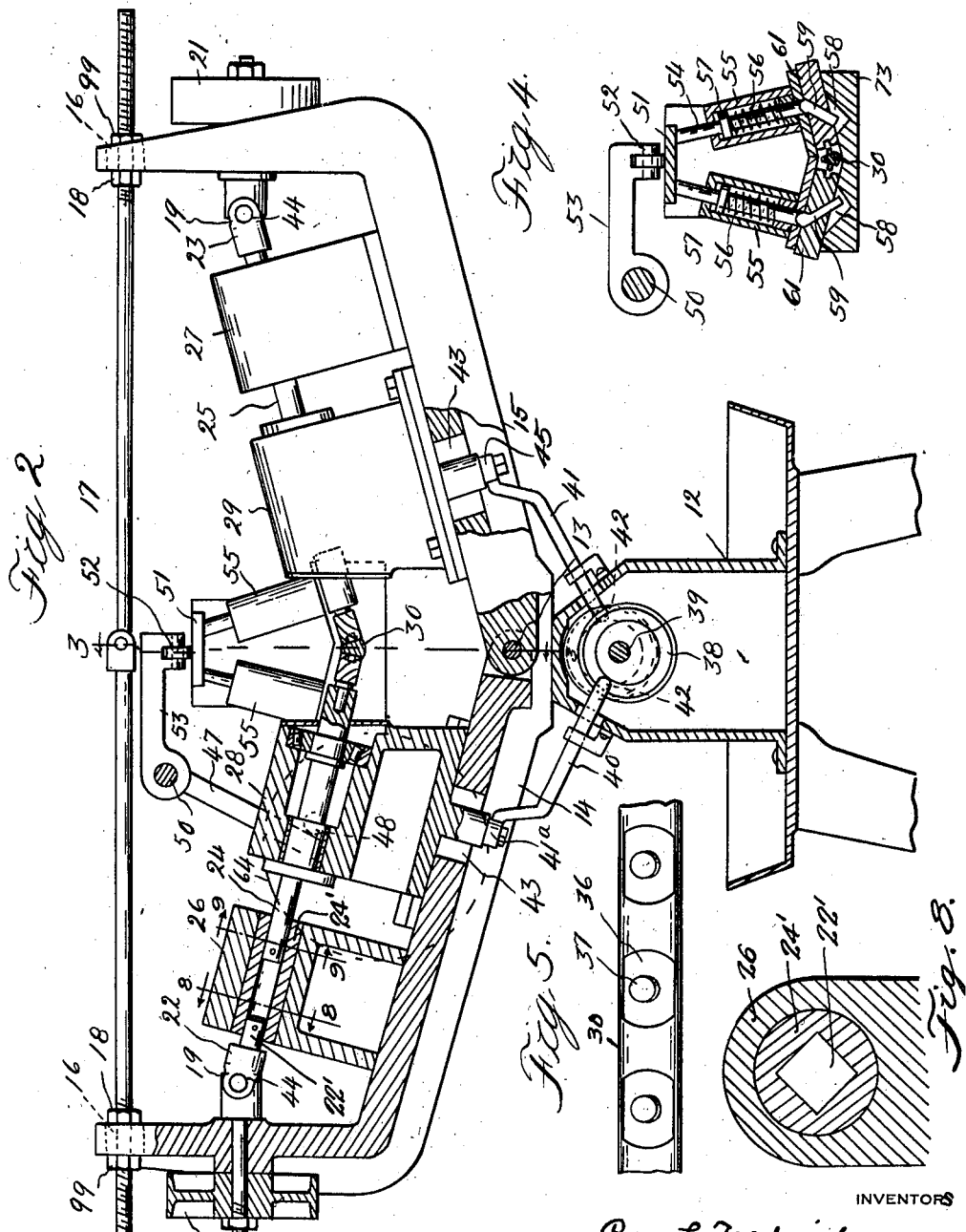
INVENTORS
Roy L. Frederick
Thomas L. Williams
BY Swan and Frye
ATTORNEYS

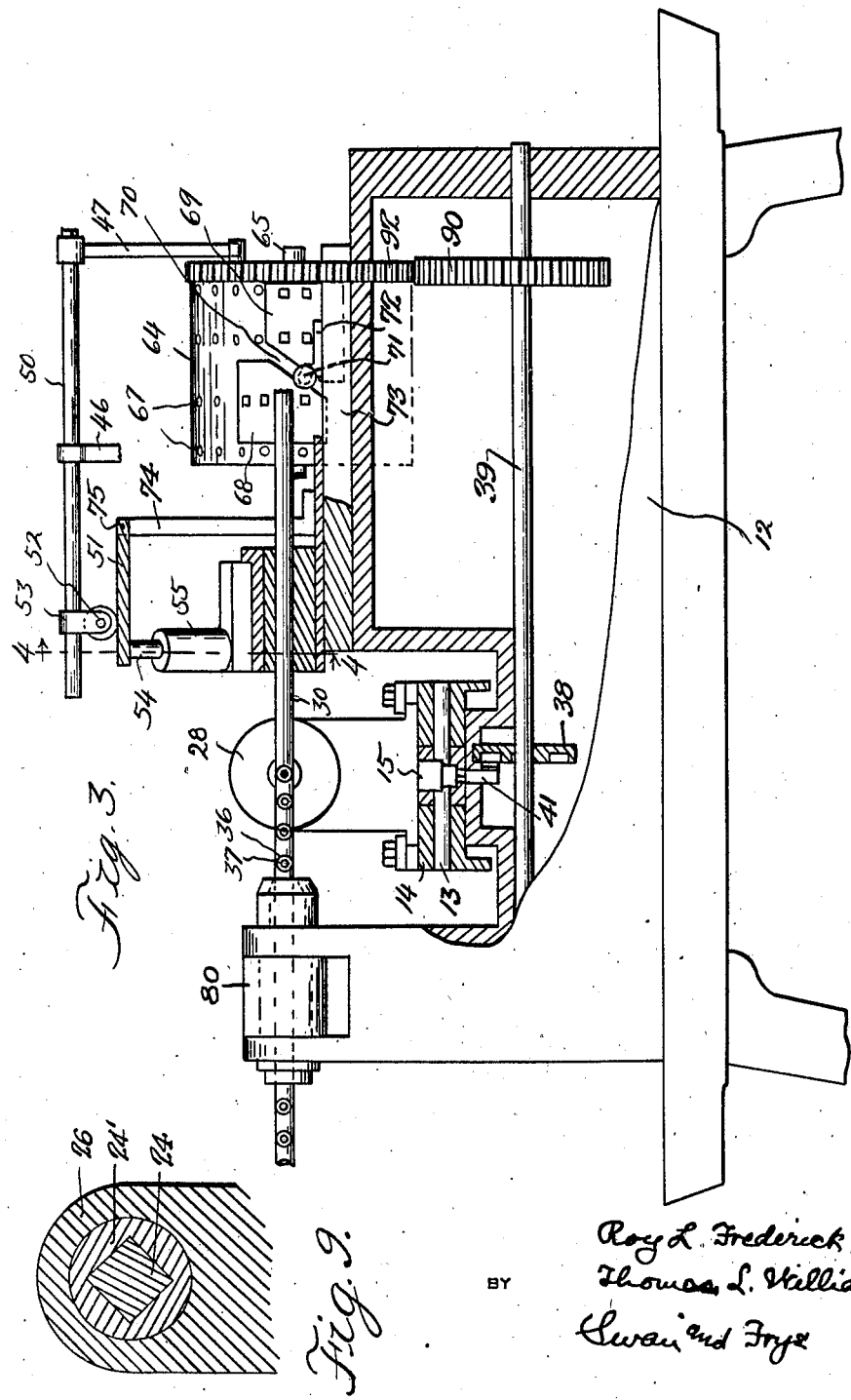

Patented Sept. 8, 1931

1,822,730

UNITED STATES PATENT OFFICE

ROY L. FREDERICK AND THOMAS L. WILLIAMS, OF DETROIT, MICHIGAN

METHOD OF MACHINING INDIVIDUAL UNITS AND APPARATUS THEREFOR

Application filed April 11, 1929. Serial No. 354,331.

This invention relates to an improved method or process of forming selectively contoured machined articles in multiple from parent bar stock, and to an improved organization of parts whereby all but the final process step of severing the machined sections from one another may be accomplished. It has for its object not only rapidity and unusual accuracy of production of such parts, as, for example, clutch and universal joint knuckles, but as well a very material reduction in the initial cost of such articles from that which it has hitherto been possible to attain. Not only has an uncomfortable proportion of such cost been ascribable to the necessary holding apparatus for positioning the individual and relatively small articles for machining, but as well their very small size and the difficulty of positioning them accurately, even with the greatest of care, has too often resulted in apparently slight variances from one another and from the shop specifications or master article, which, within the close inspection limits required for many such articles, has resulted in their rejection. By the use of my improved process and of our preferred form of apparatus for carrying it out, or any fair equivalent thereof, we have been enabled to reduce such losses to a minimum while also reducing the production expense to a surprising degree.

In the drawings:

Figure 1 is a plan view of our apparatus from above, bringing out the relation of the bar-machining parts and of the apparatus for seizing and advancing the bar within the operative reach of such parts.

Figure 2 is a partly sectional elevational view thereof taken along the line 2—2 of Figure 1, and looking in the direction of the arrows there shown.

Figure 3 is a sectional elevational view taken along the line 3—3 of Figure 2 and looking in the direction of the arrows there shown.

Figure 4 is a detail sectional elevational view of our preferred form of bar-seizing and advancing mechanism, taken along the line 4—4 of Figure 1 and looking in the direction of the arrows there shown.

Figure 5 is a large scale fragmentary elevational view of a bar, showing the laterally machined sections on one side thereof after the bar has passed through the process steps to be described.

Figure 6 is a perspective of a single completed section of one form of article which the following of our process steps makes it possible to manufacture, after having been severed from similar sections of the bar at either end.

Figure 7 is an end elevational view of the drum, cam, and other parts appurtenant our preferred form of bar-advancing mechanism, taken along the line 7—7 of Figure 1 and looking in the direction of the arrows there shown.

Figure 8 is a large scale sectional view of the journaling construction whereby the lengthwise reciprocation of the cutters is made possible, being taken along the line 8—8 of Figure 2, and looking in the direction of the arrows there shown.

Figure 9 is a similar sectional view, taken along the line 9—9 of Figure 2, and looking in the direction of the arrows there shown, designed to illustrate the corresponding journaling of the other reciprocable shaft, there located.

12 represents a base or table, upon the top of which are pivotally supported, as at 13, the meeting ends of a pair of limitedly adjustable arms or brackets 14 and 15, the tip ends of which are slotted, as at 16, for the adjusted engagement therethrough of a bar or link 17. Each end of this bar is screw threaded, and on each end ride two nuts, as 18 and 99, one on either side of the tip of the bracket, by means of which the degree of draw of the bar upon the pivoted arms 14 and 15, and their consequent angular relation to one another, may be adjusted in a way that will be obvious. In the rising portion of each bracket or arm 14 or 15, below the slotted ends already referred to, are journaled the shafts of power pulleys 20 and 21, the outer ends of these shafts being similarly formed, as at 19, for connection with universal joints, as 22 and 23 respectively, which are carried on ends of shafts or cutter members 24 and 25 respectively, these shafts being journaled in suitable boxings or housings, as 26, 27, 28 and 29, resting upon the arms or brackets 14 and 15 respectively, as the common almost-meeting-point of the inner or cutting ends of the shafts is approached. In Figure 2 we have illustrated these shafts and their appurtenant parts as each occupying a position of perhaps 15° angularity to the horizontal, but it will be obvious that by suitable adjustment of the nuts 18 and 99 on the bar 17 this angularity may be varied from nothing to a considerably sharper angle than is here illustrated, indeed to less than right angularity, depending on the contouring that it is desired to give to the bar 30, which is caused to approach the operative range of the cutter ends of the shafts in a perpendicular direction to the axes of the latter, this being brought out in all three of the large figures. It will thus be obvious that any selected sections of an initially plain bar thus positioned can be operated on with great accuracy as to the position, angularity and depth of the cut imposed on either lateral face, while the bar can easily be held with ample rigidity to insure against its moving while being worked upon in a way that a small article, perhaps less than an inch in length, could under almost no circumstances be held. Subject, therefore, to the accurate advancing of the bar between the cutting operations, so that the laterally machined sections will be very accurately spaced one from another, it is possible to thus machine such a bar in repeated multiple throughout practically its whole length; and a bar thus machined can thereafter be cut in such appropriate sections as desired, emerging as a completed article ready for inspection or for further machining, as for example, the cutting away of each unit or section at one end, as brought out at 31 in Figure 6, as contrasted with the initial peripheral extent of the bar, which is indicated at 32 in said figure. In some cases it is as well desirable to round off by subsequent, easily performed machining steps the corners 33 and 34, so that the forward plain end 35 of the completed article is of even lesser diameter than the machined rear end 31 just referred to. In any event the selected axially angular position of the cutting members, if adhered to, will result in a corresponding angularity or sloping toward one another of the lateral plane machined faces of the bar, of which one is indicated at 36 in Figure 6, and from the center of which, if a suitably bored out end be provided for the cutting tool, there may arise an integral stud or trunnion 37.

In Figures 1 and 2, particularly the latter, is shown our preferred form of mechanism for effecting the timed projection toward one another and toward the interposed bar 30 whose machining is desired, and their retraction between successive machining operations, of the cutting shafts 24 and 25. It consists essentially of a track cam 38 which is operated in timed relation to the action of the other members by rotation of its supporting shaft 39; into the grooves on the faces of the cam 38 extend rollers 42 which are carried on the ends of links 40 and 41, one of which as 40 extends as at 41ª to connection with a depending projection from the limitedly slidable journal box 28 while the other link 41 similarly extends as at 45 to connection with the box or housing 29 on the other side of the supporting frame. It will be noted that each of these depending projections from the boxes or housings passes through a slot or cut-away portion as 43 in its arm of the supporting frame as 14 or 15, so that as each box or housing is drawn lengthwise thereof by the cam-actuated movement of its link, the movements of these boxes or housings lengthwise of their respective supporting frame branches is permitted to the degree necessary to effect the draw of the cutter ends 24 and 25 away from one another, or their movement toward one another, to the desired degree for effecting the alternated release of any just-machined section of the bar 30, or to start their cutting action upon the sides of the next forwardly projected sections of the bar. The play space thus needed to allow the advance and recession of the cutting tools and the shafts 24 and 25 is obtained in the journal boxes 26 and 27 in the manner shown in Figures 8 and 9, and at 26 in Figure 2, which show the shafts 22' and 24 to be square, and the shaft 24 slides freely in the rotating member 24', which has a square aperture axially through its length. The rotating sleeve 24' is driven by the square shaft 22' which is driven from the drive wheel 20 and the drive shaft through the universal joint 19. It is of course obvious that other equivalently functioning members for effecting this alternated projection and retraction of the cutter shafts could be substituted for the specific parts here illustrated without departure from the fair spirit of our invention. The shaft 39 extends through the base 12 and is driven in timed rotation relative to the shaft 65 through suitable spur gears, as 90, and 92, Figures 1, 3 and 7.

Our preferred form of bar-advancing mechanism, though we do not desire to be understood as restricting ourselves thereto, consists of a lever 51, pivotally supported as at 75 from an end of the vertical portions of the standards 74, which are mounted on the slidable base 73, with sufficient space between them to allow passage of the stock bar 30. The lever 51 bears upward against but is freely slidable along the lever 53, as at 52. The lever 52 is attached to a shaft 50, which is positioned axially parallel with the course of travel of the bar 30 and somewhat to one side thereof, as brought out particularly in Figures 1 and 2. From the shell portion 51 there depend a pair of stems 54, the lower end of each of which is enclosed by a shell 55 within which is positioned a compression spring 56 which engages about the stem 54, washers or collars 57 being provided about the stems 54 near the top of the shells 55 to serve as abutments for the top end of the springs 56. In the bottom of the shell 51 are provided angular grooves or guide slots 58 within which engage the free lower ends of dogs 59, which are pivotally connected at their upper ends with the lower ends of the shafts or stems 54. When these dogs are retracted toward a position approaching the vertical by the spring-induced upward movements of the stems 54, their action upon the blocks 61 is such as to draw each of these away from the seizing engagement of the bar 30, as illustrated in Figure 4, whereas when these stems 54 are actuated in the opposite direction, against the pressure of the springs 56, the engagement of the tips of these dogs 59 in the contoured bottoms of the grooves 58 is such as to throw the blocks 61 into firm seizing engagement with the bar 30.

The preferred mechanism for effecting the alternated seizure and release of the bar 30 by the blocks 61 just mentioned is shown particularly in Figures 1, 2, and 7. It consists of a drum 64, mounted on the shaft 65, supported in suitable bearings in parallel relation to the shaft 50 and bar 30, and designed to be rotatively driven in suitable timed relations by the belt-driven pulley 66. This drum is provided with rows of encircling holes or studs 67, whereby there can be adjustably positioned upon its periphery the spaced and more or less angular plates 68 and 69, between which, at each rotation of the drum 64, passes the roller 71, which is carried on the laterally projecting stud or bracket 72 which is an integral part of the reciprocable table 73, whereon are also mounted the brackets 74 and whereon the bar-engaging blocks 61 rest, through whose suitably contoured center portion the bar 30 passes. The space 70 which separates the plates 58 and 59 on the drum, as brought out particularly in Figure 1, is of chevron or V-shaped contour, so that as the roller 71 passes through it there is first imparted to the reciprocable table 73 a forward movement which is immediately followed by a retractile movement. The forward movement takes place at the instant that the blocks 61 have seizingly engaged the bar 30 on either side, so that it is thus advanced the unit of length desired to bring its forwardmost unmachined section into the operative range of the cutters 24 and 25. At the time the roller 71 has reached the apex or angle of the space 70 this seizure of the bar 30 by the blocks 61 is terminated, in the manner already described, so that the retractile movement of the table 73 and with it the standards 74 and their associated bar-engaging parts finds these latter free to move back without carrying the bar 30 with them. The next forward movement the reciprocable table 73 and its associated parts, induced by the engagement of the roller 61 in the slot or space 70 at the next revolution of the drum 54 finds the bar-engaging parts which the table partially supports in seizing engagement with the next rearward section of the bar 30 from that engaged by it at the previous forwardly-projective movement of these parts.

The alternated compressive and relieving movement of the parts motivated by the lever 51 with respect to the bar 30 is effected by its timed depression by the lever 53, which is attached to the shaft 50, which extends in parallel relation to the bar 30 whose projection for machining is desired. This shaft 50 is rotatably journaled in suitable bearings or supporting brackets 46 which rise from the main base or table 12, and adjacent its rear or furthermost end as regards proximity to the cutter members is fixed a laterally projecting arm or bracket 47 which is intermittently engaged at its outer or free end by the stud 48 which projects from the end of the rotating drum 64, which has already been described. Each time the bracket 47 is thus engaged, and moved upward, the bar-seizing parts contained within the shell 51 are actuated, by reason of the intermittent partial rotation of the shaft 50 and consequent actuation of the attached lever 53, so that since both parts are thus actuated synchronously the alternated seizure and projection, and release of the bar 30 is thus effected between and past the cutter members. It is of course obvious that other equivalently functioning parts for the specific mechanism here suggested could be employed if desired for this bar-advancing portion of the mechanism's operation. The figure 80 indicates a suitable chuck for receiving and supporting the finished bar.

What we claim is:

1. The method of machining individual units of closely limited uniformity of contour, from relatively long bar stock, consisting in advancing successive lengths thereof between the temporarily outdrawn members of a holding mechanism, actuating the latter to hold the entire bar, including the section which is next to be worked upon, immobile during a selected phase of each operative period as a whole, applying laterally positioned and axially lengthwise movable cutting members to selected peripherally spaced points about the section of the bar then being worked upon, thereafter effecting the timed retractile movement of said cutting members from further operative proximity to the then completely machined section of the bar, and thereafter effecting the severance of the section thus machined preparatory to the next bar-advancing phase of the mechanism.

2. The process of producing in quantity from bar stock a plurality of articles of identical contour within narrow inspection limits as to the size and position of their characteristic profiled parts, consisting in effecting the intermittent measured travel of such a bar lengthwise of itself between the ends of a pair of then outdrawn machining members which are capable of limited movement in directions axially lengthwise of themselves, effecting the non-displaceable holding of said bar contemporaneously with the actuation of said cutting members against selected portions of the sides of the bar section then operatively flanked by them, and thereafter releasing said bar from its clamping seizure and severing the section thus contouringly machined, preparatory to the next lengthwise actuation of the bar.

3. The method of producing from initially unitary bar stock a plurality of individually and identically contoured units of selective contour, consisting in causing the intermittent travel of such a bar axially lengthwise of itself alternated with periods of firm seizure thereof by the members of a laterally flanking mechanism, between which the path of travel of such bar lies, and during such periods of holding seizure causing the travel toward selected surface portions of the section of the bar then under treatment of a pair of axially lengthwise movable machining members, each of which, though at all times in perpendicular relation to the axis of the bar, is capable of selective angular positioning relatively to its companion machining member according to the locations upon the surface of the bar section at which it is desired that the machining operation performed by it shall take place.

4. Apparatus for plurally and identically machining selected sections of the opposite faces of a bar, comprising in combination a pair of angularly positionable and rotatable machining members between whose adjacent end portions the bar is adapted to be passed by intermittent steps of predetermined length, means for regulatably effecting the contemporaneous movement of said machining members toward and away from one another lengthwise of their respective axes, and means operating synchronously with said last mentioned members for effecting the desired travel of the bar.

5. An apparatus for successively machining selectively spaced portions of each lateral face of a bar, comprising means for intermittently advancing a bar past a selected operative point, a pair of rotatable machining members each reciprocable lengthwise of its axis adapted to simultaneously act upon the opposite faces of a bar fed between them in a direction perpendicular to the plane wherein said machining members lie, means for effecting their simultaneous timed movement toward and away from one another, and means for permitting variant angular adjustments of said machining members relatively to one another and to the bar upon which they are designed to work.

6. In combination with means for effecting the regulated intermittent travel of a bar in a direction lengthwise of its axis, a pair of rotatable machining members each of which is reciprocable lengthwise of its axis, adapted to act in unison upon opposing faces of said bar, means for effecting the contemporaneous movement of said machining members toward and away from said bar and one another, and means for adjusting the angular relation of the line of travel and operation of said machining members relatively to the bar.

7. The combination, with means for effecting the intermittent movement of a bar lengthwise of its axis, of means for successively and identically contouring the individual sections of the bar as thus advanced, comprising a pair of rotatable, terminally active milling cutters flanking the bar as it is successively advanced, and synchronously operating means for effecting the alternated movement of said machining members toward and away from the bar and from one another in timed relation to the successive actuated movements of said bar, and means for regulatably adjusting the angle of operative activity of said machining members with respect to one another and to the bar.

8. In combination with a supporting base and a pair of branches hingedly supported thereby and adapted to extend in either direction therefrom, means for adjusting said branches individually to positions of desired angularity with respect to the work to be done, rotatable cutter members supported by said branches, means for automatically effecting the movement of said cutter members lengthwise of their respective axes toward and away from one another in a predetermined time cycle and transversely of the axial extent of the article being worked upon, and means for regulatably and intermittently effecting the movement of a parent stock bar lengthwise of itself and between the operative portions of said cutter members, thereby subjecting successive and similarly sized units of the bar to the contouring action of said machining members.

9. The combination with a pair of rotatable cutter members oppositely disposed in spaced terminal relation, of means for effecting the movement of said cutter members in directions respectively axially lengthwise of themselves toward and away from one another in timed sequence, means for effecting the intermittent and selectively spaced travel of a rod lengthwise of itself between said cutter members and in a direction perpendicular to the axes of the latter, and means for regulatably varying the angular line of approach of said cutter members toward one another and with respect to the portion of the rod's surface operatively engaged by each cutter during each cycle of operation.

In testimony whereof we sign this specification.

ROY L. FREDERICK.
THOMAS L. WILLIAMS.